United States Patent [19]

Stankowiak et al.

[11] Patent Number: 5,238,592
[45] Date of Patent: Aug. 24, 1993

[54] LIQUID DE-ICING AGENT BASED ON ACETATES AND PROCESS FOR MELTING SNOW AND ICE ON TRAFFIC SURFACES WITH THE AID OF THIS AGENT

[75] Inventors: Achim Stankowiak, Burgkirchen; Josef Kapfinger, Falkenberg/Zell; Gerhard Bettermann, Erftstadt, all of Fed. Rep. of Germany

[73] Assignee: Hoechst Aktiengesellschaft, Frankfurt, Fed. Rep. of Germany

[21] Appl. No.: 787,370

[22] Filed: Nov. 4, 1991

[30] Foreign Application Priority Data

Nov. 2, 1990 [DE] Fed. Rep. of Germany ....... 4034792

[51] Int. Cl.$^5$ ............................................... C09K 3/18
[52] U.S. Cl. ........................................ 252/70; 252/76; 252/79; 106/13
[58] Field of Search ................ 252/70, 76, 79; 106/13

[56] References Cited

U.S. PATENT DOCUMENTS

| | | | |
|---|---|---|---|
| 4,283,297 | 8/1981 | Peters et al. | 252/70 |
| 4,388,203 | 6/1983 | Nimerick et al. | 252/70 |
| 4,487,712 | 12/1984 | Wilson et al. | 252/76 |
| 4,728,393 | 3/1988 | Peel | 252/70 |
| 4,759,864 | 7/1988 | Van Neste et al. | 252/75 |
| 4,855,071 | 8/1989 | Todd, Jr. et al. | 252/70 |
| 5,064,551 | 11/1991 | Smith | 252/70 |
| 5,104,564 | 4/1992 | Kardos et al. | 252/76 |

FOREIGN PATENT DOCUMENTS 0375214 6/1990 European Pat. Off. .

*Primary Examiner*—Christine Skane
*Attorney, Agent, or Firm*—Connolly and Hutz

[57] ABSTRACT

The de-icing agent described comprises an aqueous solution of at least one alkali metal acetate or at least one alkaline earth metal acetate or a mixture of the two and water as the main components, and 0.01 to 1% by weight of at least one water-soluble triazole compound or at least one water-soluble imidazole compound or a mixture of the two and, if appropriate, 0.01 to 0.5% by weight of at least one alkali metal phosphate as inhibitors. The process described for melting snow and ice on traffic surfaces comprises application of an effective amount of the novel de-icing agent to the ice- and/or snow-covered surfaces to be treated.

3 Claims, No Drawings

LIQUID DE-ICING AGENT BASED ON ACETATES AND PROCESS FOR MELTING SNOW AND ICE ON TRAFFIC SURFACES WITH THE AID OF THIS AGENT

DESCRIPTION

The invention relates to a liquid de-icing agent based on alkali metal acetates, alkaline earth metal acetates or a mixture of the two for traffic surfaces. The invention furthermore relates to a process for melting snow and ice on traffic surfaces using this agent.

Snow and/or ice on roads, cycle tracks, footpaths, bridges, sports grounds, airports and the like (called traffic surfaces below) leads to a considerable impairment of traffic flow and traffic safety. It has therefore already been known for a long time to apply an agent for melting or thawing snow and ice (de-icing agent) to such surfaces; cf., for example, U.S. Pat. No. 4,283,297.

The requirements which a de-icing agent should fulfil are very diverse. The materials from which the areas in question are constructed, for example concrete, must not be damaged or even broken down by the de-icing agent. It is furthermore essential that a corrosive action on metals is also excluded. It must furthermore be ensured that there is no fire hazard as a result of high flammability and combustibility of the de-icing agent. Its composition should largely be physiologically acceptable to animals and humans. Since the agent applied may also enter drain water, biological degradability is a further requirement. The thawing agent may enter not only the drain water, but also soil used agriculturally, to which likewise no damage should be caused. It is furthermore essential that a very rapid thawing is achieved. Finally, from the economic point of view it is necessary for only a small amount of de-icing agent to be required and for this to be inexpensive.

Numerous alkali metal and alkaline earth metal salts of inorganic and organic acids are described as de-icing agents in the prior art, a salt by itself or a combination of two or more salts being used. Examples of such salts which may be mentioned are: sodium chloride, calcium chloride, calcium bromide, magnesium chloride, sodium carbonate, sodium formate, sodium acetate, potassium acetate, calcium acetate, magnesium acetate, sodium lactate and the like.

U.S. Pat. Nos. 4,388,203; 4,728,393 and 4,855,071 thus describe solid and liquid de-icing agents which contain salts of the group comprising alkali metal carboxylates, alkaline earth metal carboxylates and alkali metal or alkaline earth metal chlorides in a larger or smaller amount. In detail, the de-icing agent described in U.S. Pat. No. 4,388,203 essentially comprises water, glycols, a thickening agent and an alkali metal acetate and/or an alkaline earth metal chloride. The de-icing agent composition known from U.S. Pat. No. 4,728,393 is obtained from waste liquids from paper-making and contains, inter alia, alkali metal and/or alkaline earth metal acetates, formates, lactates and carbonates. Finally, a solid de-icing agent which comprises alkali metal and/or alkaline earth metal carboxylates having 1 to 4 carbon atoms, these having been prepared by a particular process, and calcium/magnesium acetates being emphasized as being particularly suitable, is described in U.S. Pat. No. 4,855,071.

Although the known de-icing agents based on acetates from the group comprising alkali metal acetates and alkaline earth metal acetates meet several of the abovementioned requirements, they leave something to be desired in respect of corrosion. For example, of the requirements mentioned, they meet those relating to a short thawing time, a more or less low amount required and a relatively low price. A further advantage of the acetates is that because of their water-solubility, they can also be used in the form of an aqueous solution, which is often desirable. However, the liquid de-icing agents which are based on the acetates mentioned and are advantageous per se are in need of improvement in respect of corrosion of metal. The aqueous de-icing agents in question thus have a greater or lesser corrosive action on metals, such as aluminum, magnesium, steel and galvanized steel. They furthermore show a relatively low inhibition in respect of so-called hydrogen embrittlement. As is known, hydrogen embrittlement is understood as being the embrittlement, i.e. the decrease in strength, of metallic materials due to the action of hydrogen. The presence of hydrogen results, inter alia, from electrochemical reactions on the surface of the metallic material (cathode/anode processes). Hydrogen embrittlement is a major problem above all where the metallic material is to withstand high stresses, which is the case, for example, with aircraft undercarriages, which as a rule are made of high-alloy steel. The impairment of even only part of the undercarriage by any type of corrosion obviously leads to many difficulties. The property of relatively low inhibition in respect of hydrogen embrittlement is thus a further disadvantage of the liquid de-icing agents in question, especially if they are used on traffic surfaces of aircraft, such as take-off and landing runways, parking spaces and the like.

Attempts have already been made to solve the problems mentioned of de-icing agents based on acetates and analogous salts with the aid of inhibitors. The recent European Patent Application No. 0 375 214-A1 thus describes a liquid de-icing agent which essentially consists of 45 to 60% by weight of at least one alkali metal acetate and/or alkali metal formate, 0.1 to 0.4% by weight of at least one alkali metal phosphate and 0.2 to 0.6% by weight of at least one alkali metal nitrite, and of water as the remainder to make up to 100% by weight, the percentages by weight being based on the weight of the de-icing agent. Although this de-icing agent with the inhibitor combination of alkali metal phosphate/alkali metal nitrite has improved properties in respect of the metal corrosion and hydrogen embrittlement in question in comparison with the known agents, its nitrite content is a disadvantage.

The object of the invention accordingly is to provide a liquid de-icing agent based on alkali metal and/or alkaline earth metal acetates, which displays a high inhibition of metal corrosion and hydrogen embrittlement, this inhibition being based on a practically acceptable inhibitor system. The novel de-icing agent is also to be particularly suitable for the treatment of aircraft traffic surfaces covered with ice and/or snow.

The liquid de-icing agent according to the invention essentially comprises a) 15 to 70% by weight, preferably 25 to 60% by weight, of at least one alkali metal acetate or at least one alkaline earth metal acetate or a mixture of the two, b) 0.01 to 1% by weight, preferably 0.03 to 0.5% by weight, of at least one water-soluble triazole compound or at least one water-soluble imidazole compound or a mixture of the two and c) water, as the remainder to make up to 100% by weight [percentages by weight based on the weight of the de-icing agent, that is to say on the total weight of components a), b) and c)].

The salt component of the liquid de-icing agent according to the invention is at least one alkali metal acetate and/or at least one alkaline earth metal acetate. Of the alkali metals, sodium and potassium are preferred, and of the alkaline earth metals, calcium and magnesium. Of the two acetates, alkali metal acetates and alkaline earth metal acetates, the former are preferred. The acetate of the de-icing agent according to the invention is, accordingly, preferably sodium acetate and/or potassium acetate, potassium acetate being preferred. Potassium acetate is therefore the particularly preferred acetate compound in the aqueous de-icing agent according to the invention. The concentration of acetate in the aqueous de-icing agent can vary within wide limits. It depends above all on the solubility of the acetate in water (an essentially clear solution should be present) and on the amount of solution which is intended to be applied to the traffic surface to be treated. With a more concentrated solution, a smaller amount will be required to thaw ice and/or snow than with a less concentrated solution. The preferred concentration is accordingly 15 to 70% by weight, preferably 25 to 60% by weight, the percentages by weight being based on the weight of the de-icing agent.

The inhibition of the aqueous de-icing agent according to the invention is based on triazole compounds and/or imidazole compounds, which are present in dissolved form in the finished aqueous de-icing agent in the amount to be employed. Suitable water-soluble triazoles are triazole itself and its derivatives, such as alkyltriazoles, for example methyltriazole; benzotriazoles, for example benzotriazole, aminobenzotriazole and nitrobenzotriazole; and tolyltriazole. The preferred triazoles are benzotriazole (1H-benzotriazole or 1,2,3-benzotriazole) and tolyltriazole (1H-methylbenzotriazole, as a rule an isomer mixture). Suitable water-soluble imidazoles are imidazole (1H-imidazole) and its derivatives, such as methylimidazole and benzimidazole, imidazole being preferred. Of the two types of compound, triazoles and imidazoles, the triazoles are preferred, and of these, as already mentioned, benzotriazole and tolyltriazole. The compounds in question are commercially available in the form of powders, crystals, needles and the like. The amount of triazole and/or imidazole in the de-icing agent according to the invention is 0.01 to 1% by weight, based on the weight of the de-icing agent. The effect sought can scarcely still be achieved with less than 0.01% by weight, and more than 1% by weight is in general no longer advantageous. The preferred amount of triazole and/or imidazole is therefore 0.03 to 0.5% by weight, based on the weight of the de-icing agent.

It has been found that inhibition in respect of metal corrosion is achieved to a particularly high degree if the triazole and/or imidazole is employed in combination with an alkali metal phosphate, that is to say if, in addition to the triazole and/or imidazole mentioned, an alkali metal phosphate is also present in a certain amount as a further inhibitor component. The alkali metal phosphate is preferably sodium phosphate and/or potassium phosphate. The amount of alkali metal phosphate should be 0.01 to 0.5% by weight, preferably 0.03 to 0.2% by weight, the percentages by weight being based on the weight of the de-icing agent. If an alkali metal phosphate is used as the second inhibitor, an alkali metal acetate will be employed as the acetate compound, since water-insoluble alkaline earth metal phosphates can be formed with an alkaline earth metal acetate. The liquid de-icing agent in question according to the invention thus essentially comprises a) 15 to 70% by weight, preferably 25 to 60% by weight, of at least one alkali metal acetate, b) 0.01 to 1% by weight, preferably 0.03 to 0.5% by weight, of at least one water-soluble triazole compound or at least one water-soluble imidazole compound or a mixture of the two and b') 0.01 to 0.5% by weight, preferably 0.03 to 0.2% by weight, of at least one alkali metal phosphate and c) water, as the remainder to make up to 100% by weight [percentages by weight based on the weight of the de-icing agent, i.e. on the total weight of components a), b), b,) and c)].

The liquid de-icing agent according to the invention is prepared by mixing together the individual components. This is preferably carried out by initially introducing the solvent water (completely demineralized water) into a container and adding the further components while stirring and, if appropriate, while heating, the solution required being obtained. Since all the components are soluble in water, the de-icing agent according to the invention is a clear liquid of, to a greater or lesser extent, low viscosity and therefore readily and easily manageable. The pH of the aqueous de-icing agent according to the invention is in general higher than 8. A pH of 8 to 12, preferably 9 to 11, is preferred. If the pH mentioned is not in any case present after the components have been mixed together, it is adjusted to the desired value by addition of preferably alkali metal compounds, in particular an alkali metal hydroxide, such as sodium hydroxide or potassium hydroxide.

The process according to the invention for melting snow and ice on traffic surfaces comprises applying an effective amount of the de-icing agent described to the traffic surface to be treated, i.e. an amount such that the elimination sought of ice and/or snow is achieved. This amount depends above all on the outside temperature and the amount of ice and/or snow present, and is in general 10 to 100 g per m² of ice- and/or snow-covered surface. The liquid de-icing agent can be applied, for example, with the aid of the customary spraying vehicles.

The de-icing agent according to the invention has a number of advantages. Thus, it meets the abovementioned requirements, and in addition to having a short thawing time, above all has a high inhibition of metal corrosion and hydrogen embrittlement. The fact that all these properties are achieved with acceptable inhibitors particularly distinguishes the de-icing agent according to the invention. On the basis of these particular properties, the novel de-icing agent is particularly suitable precisely also for aircraft traffic surfaces, such as take-off and landing runways, parking spaces, bus routes and the like.

The invention will now be explained in still more detail with the aid of examples according to the invention and a comparison example.

The de-icing agents of the following Examples 1 to 6 according to the invention and of the Comparison Example were prepared by mixing the components. The percentage amounts of the individual components are percentages by weight.

EXAMPLE 1

50.00% of potassium acetate
0.10% of imidazole
49.90% of water

EXAMPLE 2

60.00% of potassium acetate
0.30% of tolyltriazole
39.70% of water

EXAMPLE 3

25.00% of potassium acetate
0.04% of benzotriazole
74.96% of water

EXAMPLE 4

25.00% of potassium acetate
0.05% of benzotriazole
0.03% of sodium phosphate
74.92% of water

EXAMPLE 5

50.00% of potassium acetate
0.10% of tolyltriazole
0.05% of sodium phosphate
49.85% of water

EXAMPLE 6

60.00% of potassium acetate
0.25% of imidazole
0.15% of potassium phosphate
39.60% of water

COMPARISON EXAMPLE 50.00% of potassium acetate
0.20% of potassium phosphate
0.40% of sodium nitrite
49.40% of water The de-icing agents of Examples 1 to 6 and of the Comparison Example were tested in respect of metal corrosion and hydrogen embrittlement. The test for metal corrosion was carried out in accordance with ASTM F483 (ASTM=American Society for Testing and Materials) and by the so-called Sandwich Corrosion Test of Boeing Commercial Airplane Company, Seattle, USA. The test for hydrogen embrittlement was carried out in accordance with ASTM F519.

In the ASTM F483 test, the weighed test specimen is immersed for 24 hours under normal pressure in the de-icing agent to be tested, which is kept at a temperature of 35° C., after which its weight is determined again. The result of the corrosion test is stated as the difference in weight between the two weight determinations in milligrams per test specimen. This test was carried out with the metals aluminum, and in particular aluminum clad 2024-T0, magnesium, and in particular magnesium AMS 4375, steel C45 and galvanized steel ST10.

In the Boeing Sandwich Corrosion Test, which represents particularly stringent corrosion testing on the metal aluminum (aluminum clad 7075-T6), a specific shape of test specimen is used. The test specimen consists of two identical aluminum platelets and a filter paper impregnated with the de-icing agent to be tested; the three components are joined together in sandwich form, the impregnated filter paper lying in the middle, and are held firmly with the aid of a waterproof adhesive tape. This test specimen is kept in a drying cabinet at 35° C. under normal pressure and at the relative humidity of the environment for 8 hours, and is then kept at 35° C. under normal pressure and at a relative humidity of 90 to 100% for 16 hours. These two treatment steps are followed by a further seven steps under the conditions mentioned and likewise for 8 and 16 hours in alternating sequence. After the ninth treatment step (which is one lasting 8 hours), a tenth step is carried out, in which the test specimen is kept at 35° C. under normal pressure and at a relative humidity of 95 to 100% for 64 hours (the total testing time is therefore 168 hours). The test result is stated as a visual determination of whether or not the two aluminum platelets show signs of corrosion. The test is therefore passed if both Al platelets show no corrosion at all.

The embrittlement of steel by hydrogen, which forms when a test specimen of the steel MIL-S-5000 (a chromium nickel steel) under stress is immersed in the liquid to be tested, is measured with the ASTM F519 test. In this test, the steel test specimen is thus exposed to a certain stress in a clamping device and is immersed under these conditions for 150 hours in the de-icing agent to be tested, which is kept at 23° C. The test result is stated as a visual determination of whether or not the steel test specimen under stress has broken. The test is therefore passed if the test specimen has not broken.

TEST RESULTS

All the de-icing agents according to the invention pass the Boeing Sandwich Corrosion Test and the ASTM 519 hydrogen embrittlement test. This also applies to the de-icing agent of the Comparison Example.

The results of the ASTM F483 corrosion test are summarized in the following table, and show that the de-icing agents according to the invention also have a good inhibiting effect in respect of metal corrosion. As regards the thawing time of the de-icing agents according to the invention, they meet the rapid thawing of ice and snow required in practice.

The de-icing agents according to the invention thus show a high inhibition in respect of metal corrosion and also in respect of hydrogen embrittlement, and moreover also an absence of nitrite. On the basis of this specific combination of properties, they are particularly advantageous and meet a requirement which has existed for a long time.

TABLE 1

Test results of the metal corrosion in accordance with ASTM F483 in milligrams of weight difference per metal test specimen

| | Aluminum (mg) | Magnesium (mg) | Steel (mg) | Galvanized steel (mg) |
|---|---|---|---|---|
| De-icing agent A*) | | | | |
| 1 | ±0 | +11.1 | +0.2 | −1.4 |
| 2 | +0.1 | −18.7 | +0.3 | −6.9 |
| 3 | +0.1 | −2.7 | +0.8 | −17.1 |
| 4 | ±0 | −7.4 | +0.3 | −23.0 |
| 5 | ±0 | −14.7 | +0.1 | −2.6 |
| 6 | ±0 | +11.3 | −0.2 | −1.4 |
| Comparison | +0.1 | +18.4 | +0.2 | −27.8 |
| Values required | ±10 | ±20 | ±30 | ±30 |
| De-icing agent B**) | | | | |
| 1 | +0.1 | +3.5 | −0.5 | −1.4 |

TABLE 1-continued

Test results of the metal corrosion in accordance with ASTM F483 in milligrams of weight difference per metal test specimen

|  | Aluminum (mg) | Magnesium (mg) | Steel (mg) | Galvanized steel (mg) |
|---|---|---|---|---|
| 2 | +0.1 | −13.8 | +0.2 | −8.3 |
| 3 | ±0 | −7.4 | +0.3 | −23.0 |
| 4 | +0.1 | −11.0 | −0.1 | −17.1 |
| 5 | +0.1 | −11.8 | +0.1 | −4.8 |
| 6 | +0.1 | +3.5 | −0.2 | −1.4 |
| Comparison | +0.2 | +19.2 | +0.2 | −10.8 |
| Values required | ±10 | ±20 | ±30 | ±30 |

*)De-icing agents A are the de-icing agents of Examples 1 to 6 and of the Comparison Example.
**)De-icing agents B are the de-icing agents A, diluted with completely demineralized water in a volume ratio of 1:1.

We claim:

1. A de-icing agent, consisting essentially of
   a) 25 to 60% by weight of at least one alkali metal acetate,
   b) 0.03 to 0.5% by weight of at least one water-soluble triazole compound or at least one water-soluble imidazole compound or a mixture of the two and
   b') 0.03 to 0.2% by weight of at least one alkali metal phosphate and
   c) water, as the remainder to make up to 100% by weight.

2. A de-icing agent as claimed in claim 1, consisting essentially of
   a) 25 to 60% by weight of sodium acetate or potassium acetate or a mixture of the two,
   b) 0.03 to 0.5% by weight of at least one water-soluble triazole compound or at least one water-soluble imidazole compound or a mixture of the two, the triazole compound and the imidazole compound being selected from the group consisting of benzotriazole, tolyltriazole and imidazole, and
   b') 0.03 to 0.2% by weight of sodium phosphate or potassium phosphate or a mixture of the two and
   c) water, as the remainder to make up to 100% by weight.

3. A process for melting snow and ice on traffic surfaces, which comprises applying an effective amount of a de-icing agent as claimed in claim 1 to the traffic surfaces to be treated.

* * * * *